July 30, 1963  G. W. WRIGHT ETAL  3,099,367
LIQUID DISPENSING SYSTEM
Filed Sept. 12, 1960  5 Sheets-Sheet 5
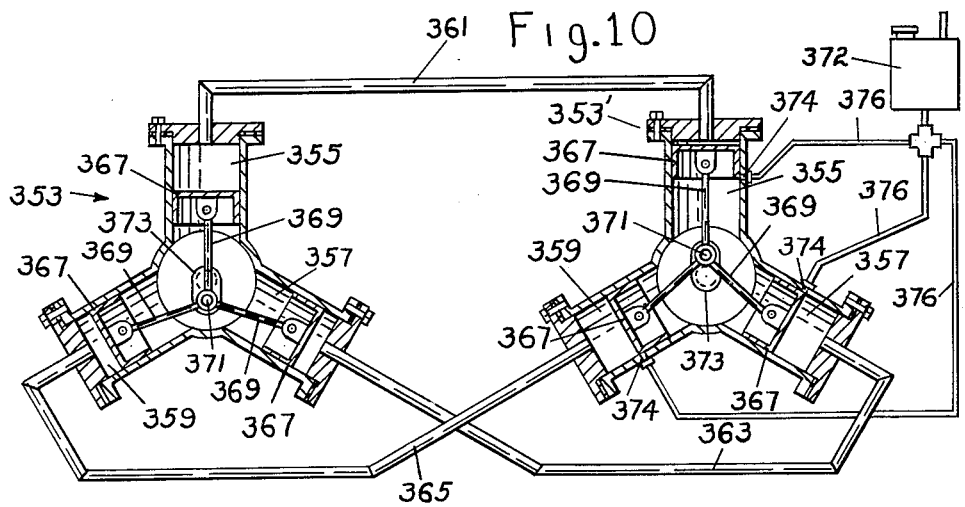
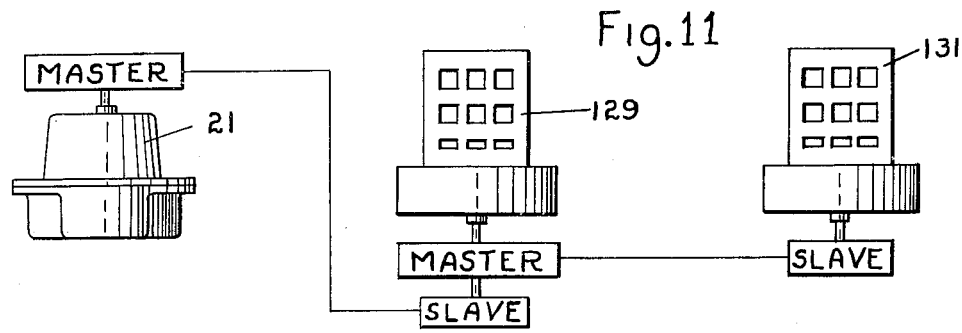
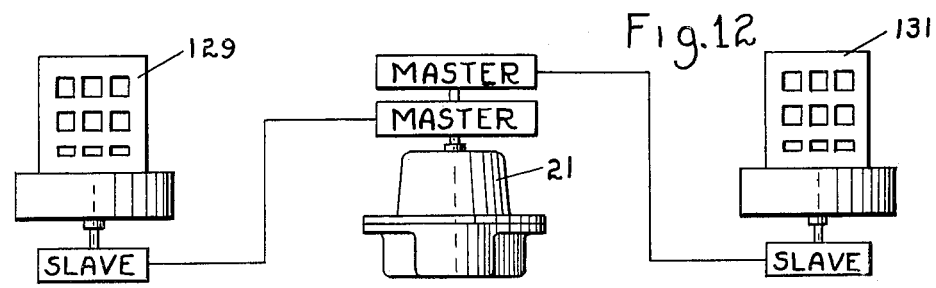
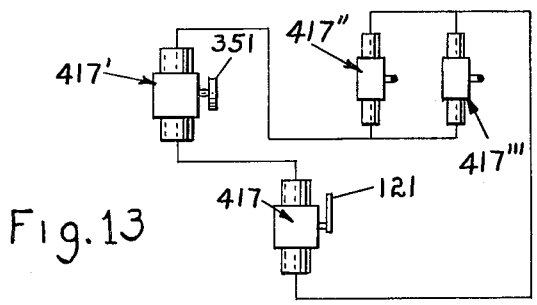
INVENTORS.
GEORGE W. WRIGHT, ROBERT J. JAUCH
BY AND CHRISTIAN W. KRUCKEBERG
Edmund W. E. Kamm
ATTORNEY ＃ 3,099,367
LIQUID DISPENSING SYSTEM
George W. Wright, Yoder, and Robert J. Jauch and Christian W. Kruckeberg, Fort Wayne, Ind., assignors to Tokheim Corporation, Fort Wayne, Ind., a corporation of Indiana
Filed Sept. 12, 1960, Ser. No. 55,290
27 Claims. (Cl. 222—26)

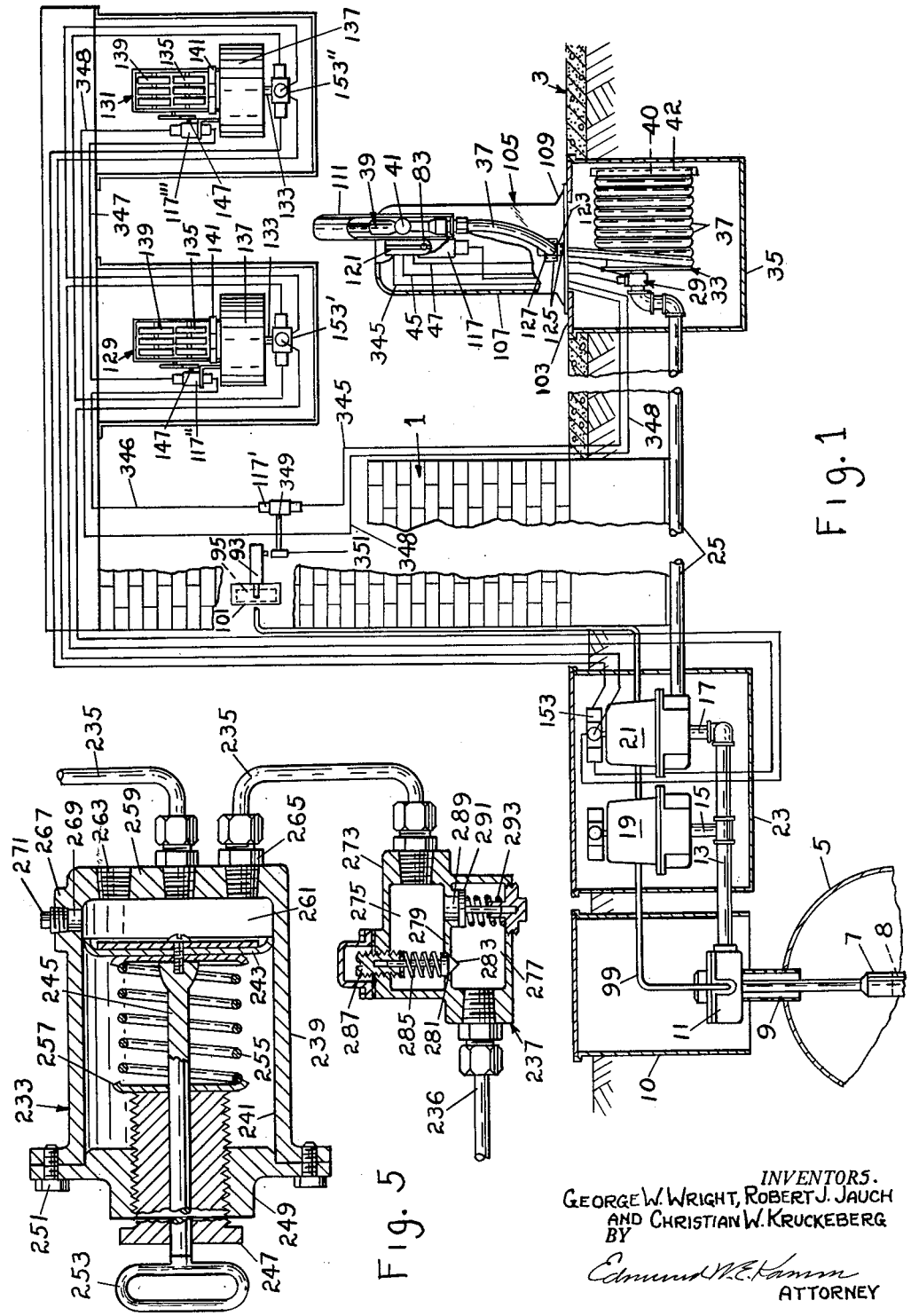

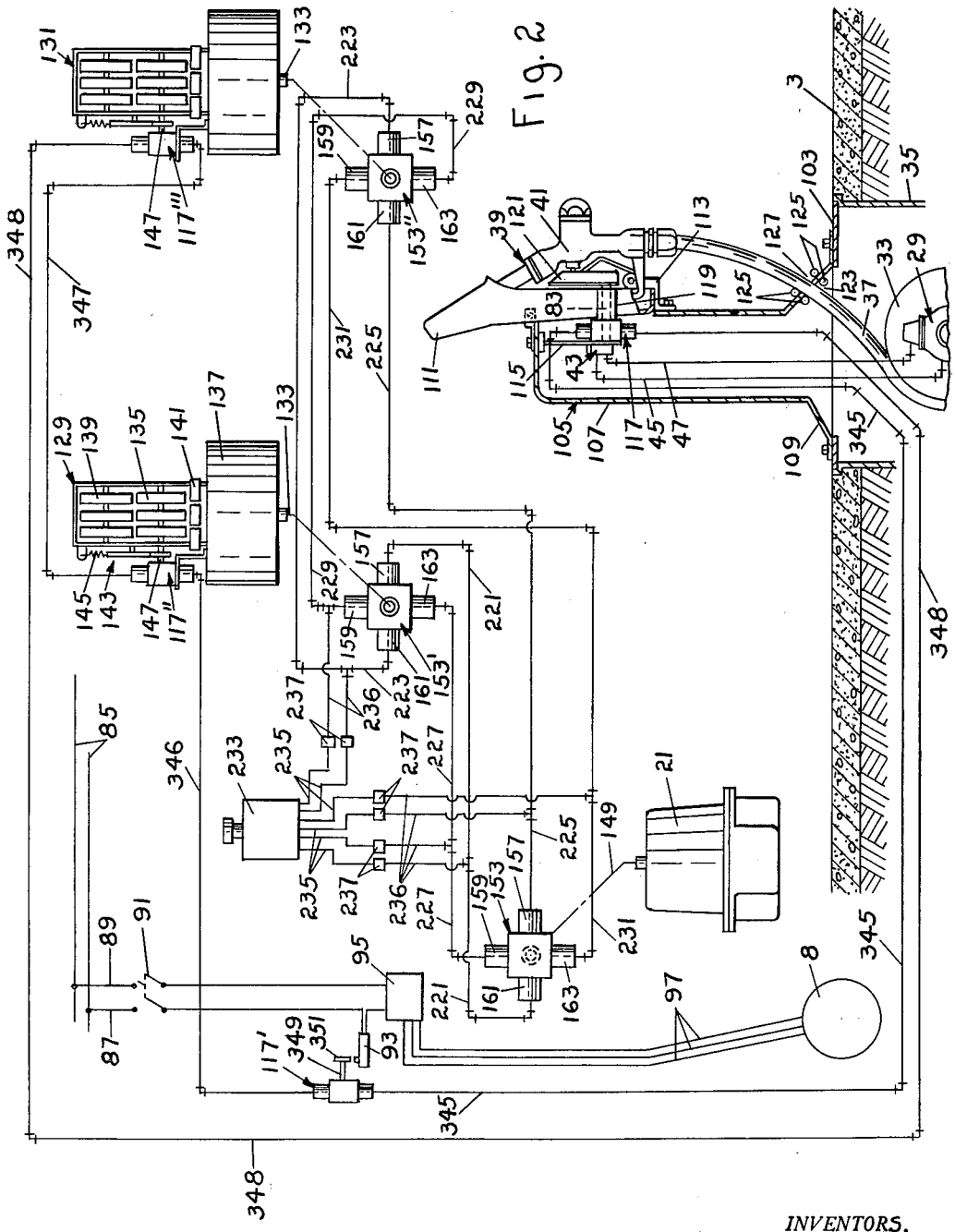

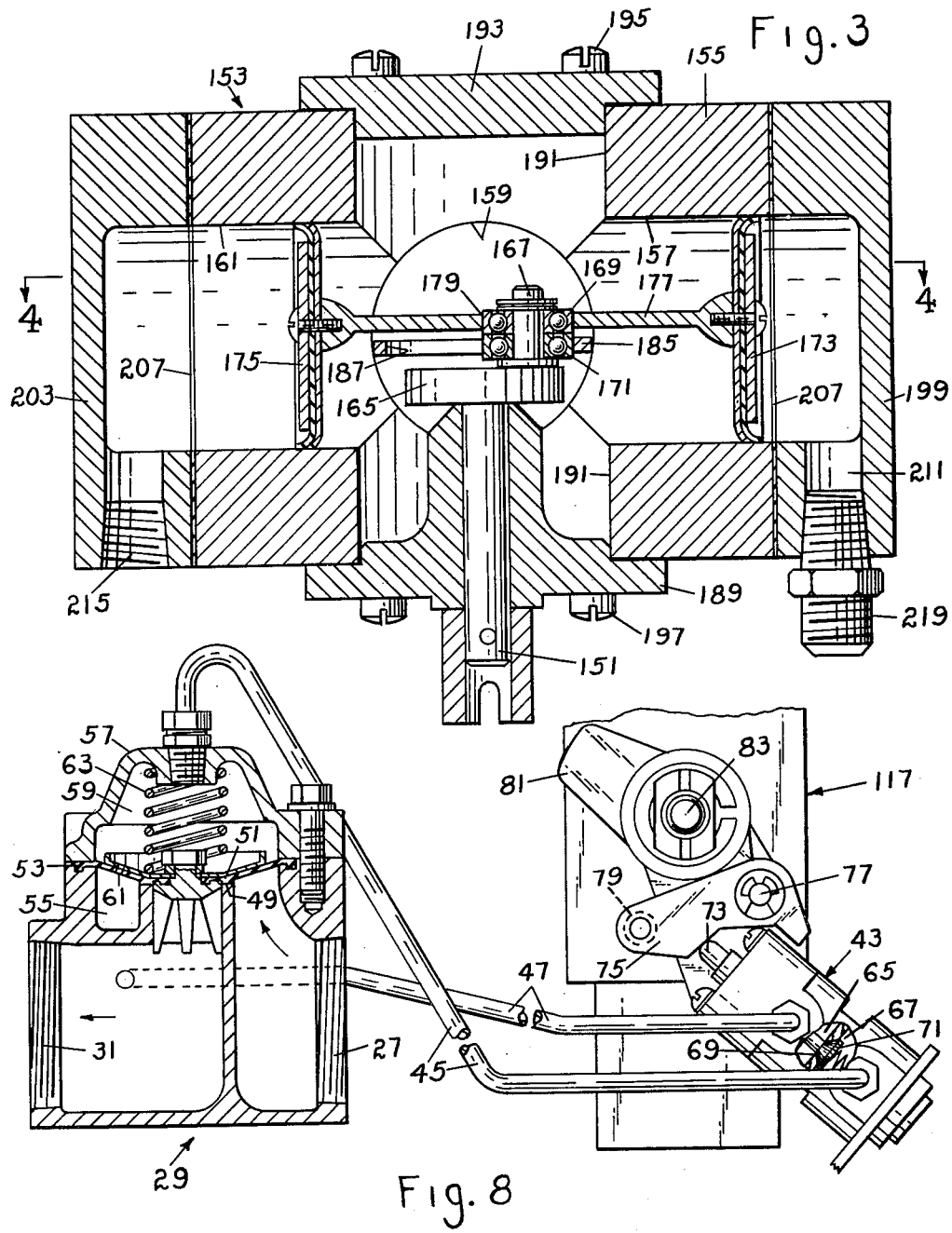

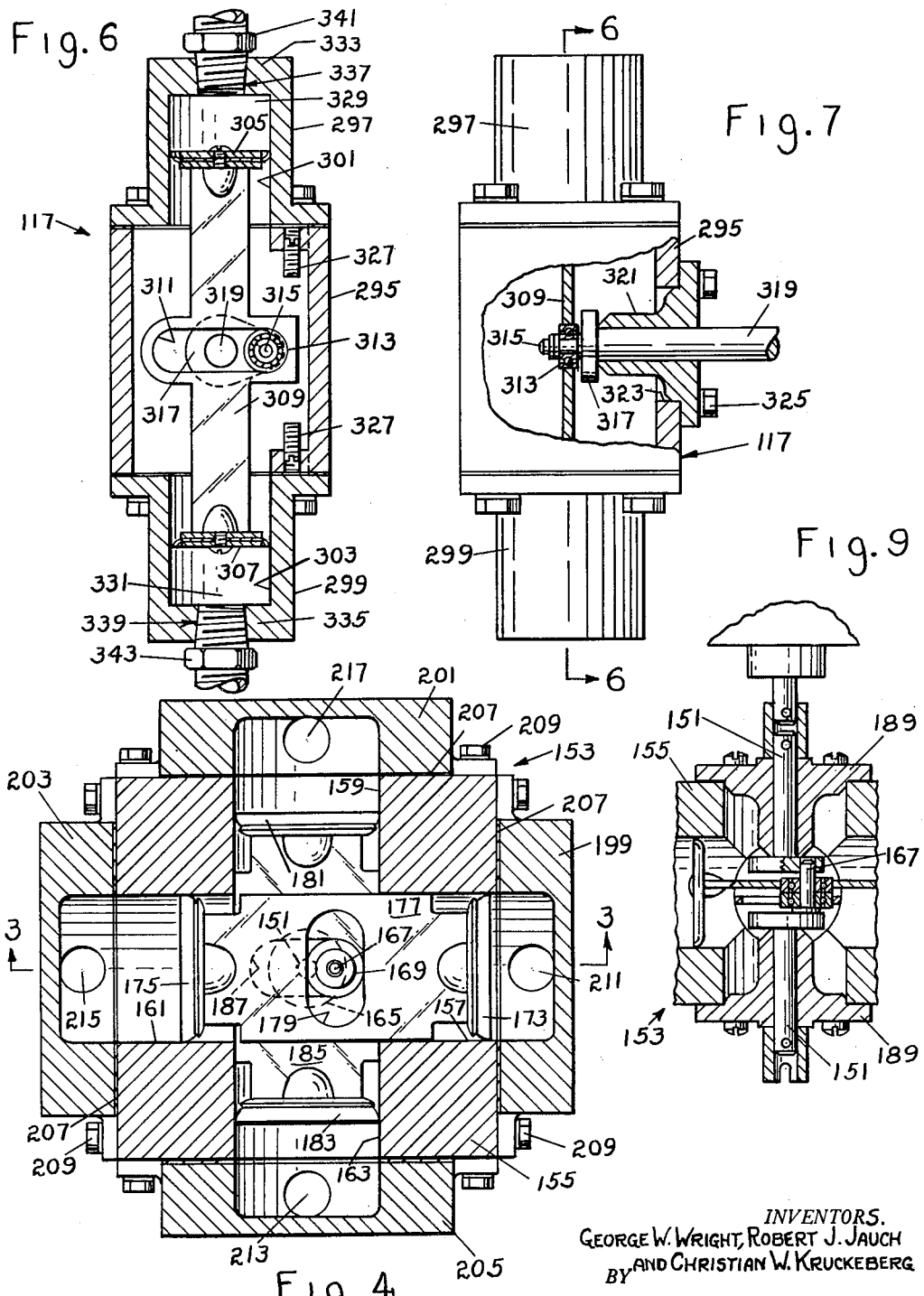

This invention relates to a liquid dispensing system and more specifically to a system for dispensing liquid fuels in an automobile service station.

The usual dispensing system of this kind comprises an underground fuel storage tank which is connected by a suction pipe to a dispenser which is located on the service floor and usually on an island. The dispenser comprises an electric motor driven pump which is connected to the suction pipe, an air separator for receiving the liquid discharged by the pump, a meter which receives the liquid from the separator and discharges it to a dispensing hose which terminates in a valve controlled nozzle. Usually the nozzle and hose are supported in or on the dispenser. The meter drives a resettable register which is usually of a computing type. Control means are provided which must be operated to reset the register before the motor switch can be closed to start the motor pump.

In recent years, submerged pumping systems have come into common use in which the pump, motor and air separator have been installed in or near the tank. This invention contemplates a system in which the meter and the register are also removed from the dispenser and in which the hose is not stored on or in the dispenser so that, in effect, the dispenser constitutes primarily a support for the nozzle and the controls and can be made rather small. Thus the relatively expensive frame and housing structures which usually form an integral part of a dispenser are eliminated.

Further, the registers, being separate from the dispenser, can be positioned where both the operator and the purchaser being served can see them. This is generally not the case in the prior types of dispensers.

Another object of the invention is to provide a system which does not require electricity to be supplied to the components which are disposed on or about the service floor. This eliminates the costly structures required to enclose electric components in explosion proof boxes and to enclose the wires in conduits. Considerable expense is thus eliminated.

Still another object of the invention is to provide a system which will provide adequate storage facilities for the dispensing hose so that a long hose can be used.

A further object of the invention is to provide a hydraulic system for transmitting the meter shaft rotation to one or more registers.

Yet another object is to provide a hydraulic control system for resetting the registers and for starting and stopping the motor pump.

Another object of the invention is to provide a hydraulic system which will accurately transmit meter shaft rotation to said registers despite slight leakage from the system and despite ambient or other temperature fluctuations.

These and other objects will become apparent from a study of this specification and the drawings thereof in which:

FIGURE 1 is general view of the entire system.

FIGURE 2 is a diagrammatic view of the hydraulic and electrical systems.

FIGURE 3 is a sectional view taken substantially on line 3—3 of FIGURE 4 showing a four cylinder hydraulic unit.

FIGURE 4 is a sectional view taken substantially on the line 4—4 of FIGURE 3 of the same unit.

FIGURE 5 is a sectional view of the compensating mechanism for a hydraulic coupler or motion transmitting system.

FIGURE 6 is a sectional view taken substantially on line 6—6 of FIGURE 7, showing a two cylinder hydraulic unit.

FIGURE 7 is an elevation of the unit of FIGURE 6, rotated ninety degrees.

FIGURE 8 is a partial sectional view showing the flow control valve and its pilot valve which are located at the outlet.

FIGURE 9 is an elevation, with parts in section, showing a hydraulic unit of FIG. 3 modified to include interconnected input and output shafts.

FIGURE 10 is a view showing a coupling system comprised of two, three-cylinder hydraulic displacement units.

FIGURE 11 is a diagrammatic view of a modified form of hydraulic transmission system using displacement units such as are shown in FIGURES 3 or 10.

FIGURE 12 is a view of a further modified hydraulic transmission system.

FIGURE 13 is a schematic drawing showing a modified form of the hydraulic, register reset and motor control systems.

Fuel Conducting Structure

Referring first to FIGURES 1 and 2, numeral 1 represents the usual filling station building and 3 the service floor or drive. Adjacent the building and remote from the drive is the buried fuel tank 5 in which is mounted a submerged motor pump unit 7, 8 which is supported on an upstanding tank nipple 9 by means of a header 11. The header is usually disposed in a pit box 10 and includes a gas separator, check and relief valves (not shown) and the pump discharges liquid under pressure into the gas separator portion of the header where gas is separated from the fuel and is discharged back to the tank, while gas-free liquid will flow through the check valve to the discharge pipe 13. A suitable header, with valves and gas separator, is fully disclosed in the Patent Number 2,812,111, issued to Wright et al. on November 5, 1957.

The discharge pipe is connected by means of a number of branch pipes 15, 17 to a number of meters 19, 21, each of which is connected to a separate dispensing outlet. The meters may be disposed in a pit box 23 as shown in FIGURE 1 or they may be disposed in an above ground housing if desired.

For the purposes of this description only the meter 21 will be considered. This meter is connected to discharge into a pipe 25 which is connected at its discharge end to the inlet 27 of a flow control valve 29 (FIGURES 1, 2 and 8), the outlet 31 from which is in turn connected to the inlet of a hose reel 33 which is also mounted in a pit box 35. The dispensing hose 37 is coiled on the reel, has its inlet end fastened to the hose reel, communicates with the valve outlet 31 through the reel, and has a dispensing nozzle 39, which is provided with a manually operated valve 41, attached to its free end.

The hose reel is preferably provided with a hose retrieving device which is here shown as a spring 40 and a spring drum 42. Of course, any other form of retrieving device such as an electric or hydraulic motor may be used.

The control valve 29 is controlled by a pilot valve 43 and is connected thereto by two control tubes 45 and 47. As shown in FIGURE 8, the control valve inlet 27 communicates with the outlet 31 through a valve seat 49. A valve 51 is carried by a diaphragm 53 which is exposed on its bottom side to inlet pressure by means of the channel 55. The diaphragm is held in place by a cap 57 which defines a chamber 59 above the diaphragm and which communicates with channel 55 through a restricted port 61. A spring 63 normally urges the valve 51 to closed position on seat 49. The tube 47 connects the outlet chamber of valve 29 with the outlet chamber 65 of the pilot valve whereas the tube 45 connects the chamber 59 with the inlet chamber 67 of the pilot valve. The chambers 65 and 67 communicate through a port 69 which is normally closed by a spring pressed valve 71 which is disposed to be opened by a plunger 73 when the latter is depressed. A lever 75, pivoted at 77, carries a roller 79 which is positioned for operation by a cam 81 which is attached to shaft 83.

It will be seen that due to the bleeding of liquid through port 61, while the valve 71 is closed, the pressure in chamber 59 and channel 55 will become balanced so that spring 63 will hold valve 51 on seat 49. However, when valve 71 is open, fluid will escape from chamber 59, by way of tube 45, chamber 67, port 69, chamber 65, tube 47 to the outlet 31 more quickly than it can enter chamber 59 through orifice 61. Accordingly, the high pressure liquid in channel 55 acting on the diaphragm 53 will overbalance the spring 63 and will open valve 51.

The shaft 83 is operated by the dispensing controls as will be described below.

Electrical System

Referring again to FIGURE 2, numeral 85 represents the power main which is connected by wires 87, 89 and a main switch 91 to a control switch 93 and through it to a motor starter 95. Wires 97 connect the starter with the motor 8 of the submerged pump unit 7.

As shown in FIGURE 1, the wires 97 are housed in a wire conduit 99 which is fastened at one end to the header 11 and terminates at its other end in a suitable box 101 which houses the starter and control switch.

Dispensing Stand

Again as shown in FIGURES 1 and 2, the reel pit 35 is provided with a cover 103 on which is mounted a dispensing stand 105 which comprises essentially merely an upwardly extending housing 107 having a widened base portion 109 which is fastened to the pit cover.

A nozzle boot 111 is suitably mounted on the housing in a position to receive the nozzle spout when the nozzle is hung on the nozzle support 113 which is also fixed to the housing.

A bracket 115 is mounted on the housing to carry the pilot valve 43 and the master control displacement unit 117 which are both operated by the shaft 83. This shaft is rotatably mounted, in a suitable bearing 119 which is mounted on the housing, at the left of the boot as shown in FIGURE 1. A manually operable lever 121 is fixed to the shaft, adjacent the outer end of the nozzle support and is adapted to be turned clockwise (FIGURE 1), when the nozzle is off the support, to start dispensing. In this position it prevents the nozzle from being replaced on its support and the lever must be rotated counterclockwise to clear the support to receive the nozzle. Rotation of the lever in the latter direction stops dispensing as will be explained below.

The base 109 of the stand is provided with an opening 123 which is suitably guarded by rollers 125 disposed along the edges of the opening and the free end of the hose 37 is passed from the interior of the pit box 35 through an opening 127 defined by the rollers 125. The rollers facilitate the pulling of the hose from the reel and the retrieving of the hose, as well as prevent scuffing or other damage to the hose.

Registers

One or more registers may be operated by the meter 21 and may be controlled from the single dispensing stand 105. Two registers 129 and 131 are shown. These registers are preferably of the basic computing type shown in Patent No. 2,814,444, issued to Bliss on November 26, 1957. However, the Bliss structure required the pressing of a button and the rotation of a shaft to cause the register to be reset and thereafter conditioned to register. The Bliss structure was modified so that the rotation of a single shaft would cause the resetting and conditioning functions to be performed, as shown in Patent No. 2,928,572, issued to Markoff on March 15, 1960. A further modification using a single rotary shaft for performing these functions is disclosed in application Serial No. 838,895, filed by Carnagua and Kruckeberg on September 9, 1959, now Patent No. 3,045,868, issued July 24, 1962. Either of the two modified forms are usable in the system disclosed herein. A complete disclosure of these rather complex mechanisms in this specification is not believed necessary since they are not being claimed specifically.

Each register comprises a driven shaft 133 which is adapted to be rotated in a predetermined direction and serves to drive a gallons counter 135 and a manually adjustable change speed gearing mechanism 137 which is commonly referred to as a variator. The variator drives the cost counter 139. The register also includes dials 141 which are operated in conjunction with the ratio adjusting mechanism of the variator to display the unit price at which the cost computation is being effected.

The registers are resettable to zero by a resetting mechanism, indicated generally by numeral 143, which is powered by a motor in the form of a spring 145 and is controlled by the shaft 147. This mechanism is fully described in the above mentioned application and the computing register is fully described in Patent Number 2,814,444, issued to H. N. Bliss on November 26, 1957, for Register, and it is believed therefore, that the details of these structures need not be further illustrated or described.

Assuming that the counters 135 and 139 display, respectively, the total gallons delivered on the preceding delivery and the product of this number of gallons and the unit price shown on dials 141. To start a new delivery, the shaft 147 will be rotated clockwise (as viewed from the left in FIGURES 1 and 2) to a predetermined position. This rotation trips the resetting mechanism which is driven by spring 145 to reset the register and to free the shaft 147 for a further rotation in the same direction.

When the shaft 133 is subsequently driven by the meter as described below, the counters of the register will advance to display the gallons delivered and the total cost.

At the end of the dispensing operation, the shaft 147 is rotated counterclockwise to its initial position to restress the spring and to condition the resetting mechanism for a subsequent resetting operation.

The register 131 is constructed and operates in the same manner as 129 and no further description thereof is believed necessary.

Hydraulic Register Drive System

The hydraulic motion transmission systems for driving shafts 133 and 147 from the meter 21 and the shaft 83 of the dispenser stand respectively will now be described. These systems are shown diagrammatically in FIGURE 2.

As there shown, the meter 21 drives a shaft 149 which in turn drives the shaft 151 (FIGURES 3 and 4) of a liquid displacement unit 153, which when combined with one or more liquid displacement units, of identical construction, forms a hydraulic motion transmission system or coupling. For convenience the driving unit, indicated by the numeral 153, is referred to herein as a "master" unit and those indicated by primed numeral 153 are referred to as "slave" units because they are driven from the master unit.

This unit comprises a body 155 which is provided with four cylinders 157, 159, 161 and 163, the axes of which are spaced 90 degrees from each other and which preferably lie in the same plane.

The shaft 151 drives a crank 165 which has a crank pin 167 extending on an axis paarllel to but offset from the axis of the shaft. Two bearings 169, 171 which are of a ball or other frictionless type, are disposed in end to end abutting relation on the crank pin.

Pistons 173 and 175 or other movable means (diaphragms may be used if desired) are sealingly disposed in the opposing cylinders 157 and 161, to form expansible chambers, and are connected to the ends of a solid link 177 which is provided with a slot 179 disposed midway between the ends of the link. The slot extends transversely of the axis of the link and has a width sufficient to snugly receive the outer race of the bearing 169. The slot has a length which is at least twice the throw of the crank, plus the external diameter of the outer bearing race and is bisected by the common axis of the pistons, so that the crank is free to turn a full revolution, in either direction, to reciprocate said pistons through a complete cycle.

Pistons 181 and 183 which reciprocate in cylinders 159 and 163 respectively, to form additional expansible chambers, are connected to a solid link 185 which is provided with a slot 187. This link and slot is a duplicate of link 177 but is disposed at a lower level than link 177 as shown in FIGURE 3, so that it will receive the outer race of bearing 171.

The shaft 151 is mounted in a bearing member 189 which is located coaxially in one end of a bore 191, the axis of which is normal to the plane containing the axes of the cylinders and which contains their projected intersection. The other end of bore 191 is closed by a cap 193. The cap and bearing member are secured to the body by suitable fasteners 195, 197. The heads 199, 201, 203 and 205 and gaskets 207 are provided for closing the outer ends of the cylinders 157 to 163 inclusive and are held in place by suitable fasteners 209. Each of the heads 199 to 205 has a passage or port 211, 213, 215 and 217 respectively which communicates with the cylinder and which is tapped to receive a suitable tubing connector 219, one of which is shown in FIGURE 3.

Thus, as the shaft 151 and crank 165 of a master unit rotates, one of each pair of opposed expansible chambers will be enlarged while the opposite chamber will be proportionately contracted. Similarly, the expansion of one of each pair of opposed chambers in a slave unit will cause the contraction of the opposite chamber and the reciprocation of the movable elements of the chambers by the incoming liquid will cause rotation of the crank 165 and its shaft 151.

The bearing member 189 and the cap 193 are interchangeable so that the shaft 151 may extend from the bottom of the master liquid displacement unit and from the top of the slave liquid displacement units. Or, if desired, the unit may merely be inverted. In other cases it may be desired to drive a register or a second unit by means of a first unit, as shown in detail in FIGURE 9 and diagrammatically in FIGURES 11 and 12, in which case a bearing member 189, shaft and crank combination 151 without the crank pin can be substituted for the cap 193, with the opening for the crank pin fitting over the projecting portion of the pin 167 so as to be driven thereby.

Referring now to FIGURE 2, it will be seen that the master displacement unit 153 has its shaft 151 connected by a shaft 149 to be driven by the meter 21 while the follower or "slave" units 153' and 153" have their shafts connected respectively to the drive shafts 133 of the computing registers 129 and 131.

In order to secure corresponding rotative direction and positioning of the shafts 133 relative to the meter shaft, expanding cylinders of one unit are individually connected with the corresponding contracting cylinders of the unit next in the series. For example, contracting cylinder 161 (FIG. 2) of the master unit 153 which is opposed to the expanding cylinder 157 thereof, is connected by tube 221 with expanding cylinder 157 of slave unit 153'; the opposed, contracting cylinder 161 of this slave unit is connected by pipe 223 to expanding cylinder 157 of the slave unit 153" and the opposed cylinder 161 of the latter unit is connected by tube 225 back to the cylinder 157 of the master unit.

Similarly the cylinder 159 of unit 153 is preferably connected by pipe 227 to cylinder 163 of unit 153'; cylinder 159 of the latter is connected by pipe 229 to cylinder 163 of unit 153" and cylinder 159 is connected back to cylinder 163 of unit 153 by line 231.

It is, of course, obvious that should the connections to either cylinders 159, 163 or to cylinders 157, 161 of the slave units be interchanged, the slave units would rotate in the opposite direction from the master. However said units would still be operating in synchronism, since the incremental angular displacements of all of the shafts would remain the same regardless of the direction of such displacement.

In a system such as that shown in FIG. 2, the cylinders and pipes must be filled with liquid while all of the corresponding pistons occupy the same relative positions in their respective cylinders. For example, all of the pistons 173 may occupy their top dead center, as shown in FIGURE 4. Further, the cylinders and lines should be filled completely full of liquid and all gas should be bled from the lines. An accumulator, forming part of the compensating means disclosed hereinafter, provides a convenient central point for filling the system.

It is of course obvious that the bore and stroke of the master unit and the slave units may differ from each other so long as the displacement is held constant.

*Compensating Means*

It will be understood that to avoid the necessity for seals on the shafts 151, the chambers which house the Scotch yoke mechanisms of the displacement units preferably are not filled with liquid and that therefore there is some possibility that small amounts of liquid may pass the pistons and thus escape from the cylinders and lines. Further, since portions of the system are exposed to outdoor ambient temperatures which vary rather widely, provision is made for the expansion and contraction of the liquid which is trapped in the various circuits.

In order to keep the lines and cylinders full of liquid at all times and under a pressure which is substantially the same in all lines and which is preferably in excess of the maximum pressure which will be produced by the operation of any of the various units, a compensating system is provided as shown in FIGURES 2 and 5.

This system comprises an accumulator indicated generally by numeral 233 which is connected by lines 235, 236, each set of which is provided with a combination check and relief valve 237, to each of the lines 221, 223, 225, 227, 229 and 231 as shown in FIGURE 2.

The accumulator and valves are shown in detail in FIGURE 5. The accumulator comprises a tank 239 which has a cylindrical bore 241 in which a piston 243 is reciprocably mounted. The piston is provided with a rod 245 which is guided by a screw collar 247 which is in turn screwed into a cap 249. The cap is mounted on the end of the tank by screws 251 so as to close the cylinder. A separable handle 253 is fixed to the end of the rod which projects through the cap.

A relatively strong spring 255 surrounds the rod, bears at one end on the piston and at its other end on a spring seat 257 which is supported by the collar. The spring urges the piston toward the cylinder head 259 to contract the liquid chamber 261. The amount of compression of the spring can be altered by screwing the collar in or out to thereby alter the pressure of the liquid in the chamber.

The cylinder head 259 is provided with a number of tapped openings 263 which are adapted to receive the fittings 265 for connecting the tank to the ends of the various tubes 235. A boss 267 is provided on the side of the tank, adjacent the cylinder head and an opening 269 is formed therein which communicates with the chamber to permit it to be filled. The opening is otherwise closed by a plug 271.

The combination valve 237 comprises a body 273 having an interior cavity which is divided into two chambers 275, 277 by a partition wall 279. Each of the lines 235 connect the accumulator chamber 261 with the inlet chamber 275 of one of the valves 237 while the tube 236 connects the chamber 277 of a valve to one of the pipes of the hydraulic transmission system.

A relief valve port 281 is formed in the wall 279 and is surrounded by a seat on which the relief valve 283 is normally held seated by a spring 285. The pressure exerted on the valve by the spring is adjustable by means of the screw 287 so that the valve will open when excess pressure exists, in chamber 277, which exceeds the pressure in chamber 275 by a predetermined amount.

A check valve port 289 which is surrounded by a valve seat, is also formed in wall 279 and a check valve 291 is urged by spring 293 in a direction to close the port. The spring is preferably a rather weak spring so that the valve will open readily under a small excess of pressure in chamber 275 over that in chamber 277.

Thus if the pressure in any line 221 to 231 falls slightly below the pressure in chambers 261 and 275, due to leakage or contraction of the liquid therein, liquid will flow through line 235, check valve 291 and line 236 to maintain the pressure.

Should the pressure in any line 221 to 231 become greater than that in chamber 261 by the predetermined amount for which the spring 285 has been set, because of thermal expansion, liquid from the particular line involved would flow back through the corresponding line 236, relief valve 283 and line 235 to chamber 261.

In order to refill the chamber 261, handle 253 would be blocked in the position which it occupies and plug 271 would be removed. Thereafter the piston would be pulled back, against the action of spring 255 while additional liquid is poured into the chamber. The latter should be filled full before the plug is reinserted, after which the handle can be released so that the spring and piston will again pressurize the liquid in the chamber 261.

Since the transmission system in the application disclosed will be subjected, at times, to low, outdoor temperatures, it is preferred to use an arctic lubricating oil of about a number 10 S.A.E. grade which retains its fluidity even at sub-zero temperatures. Of course any type of liquid which is suitable to the conditions surrounding installation may be used. In some cases ordinary hydraulic brake fluid would be suitable.

*Hydraulic Register and Switch Control System*

As shown in FIGURES 2, 6 and 7, a system similar to the hydraulic register drive system described above is used to reset the registers and operate the motor pump switch. Since the shaft 147 and the switch operating shafts do not require a complete revolution to perform their functions, two cylinder master and slave displacement mechanisms are provided. As in the register drive system, a master displacement unit combined with one or more slave displacement units forms a fluid coupling.

As stated above, the master unit 117 is operated manually by the lever 121 and shaft 83 which are mounted on the dispensing stand 105 (FIGURE 2). The slave unit 117′ is arranged to operate the motor switch while slave units 117″ and 117‴ are connected to operate the respective resetting mechanisms of the computing registers 129 and 131.

All of the master and slave units are preferably made alike and, as will be seen from FIGURES 6 and 7, they each comprise a body 295 to the opposite ends of which are attached cylinder blocks 297, 299. These blocks are bored to provide axially aligned, opposed cylinders 301, 303 in which pistons 305, 307 are reciprocably mounted. The pistons are connected by a link 309 which is provided with a transverse slot 311 which is wide enough to receive a roller bearing 313 which is mounted on pin 315 of the crank 317. The crank is driven or drives a shaft 319 which is supported in a bearing member 321 which is mounted in an opening 323 in the body by means of screws 325.

The length of the slot 311 is such that the crank may rotate freely through the central position shown in FIGURE 6 to a position about, but preferably less than, 90 degrees on either side. If desired, stops 327 may be provided in the body to prevent the link from moving to a position too near dead center of the crank in either direction.

Liquid chambers 329 and 331 are thus formed between the cylinder heads 333, 335 and their respective pistons 305, 307 and internally threaded passages 337 and 339 are provided in the respective heads to receive tubing connecting means 341, 343. As shown in FIGS. 1 and 2, the master unit 117 and the slave units 117′, 117″ and 117‴ are connected in series by tubes or conduits 345, 346, 347 and 348. When the lever 121 is rotated a short distance in a clockwise direction (FIG. 1), fluid is displaced from the lower cylinder of the master unit 117 into the upper cylinder of the slave unit 117‴ to reset the register 131 and liquid displaced from the slave unit 117‴ forces fluid from its lower cylinder through line 347 into the upper cylinder of the slave unit 117″ to reset the register 129. The fluid displaced from the lower cylinder of the slave unit 117″ flows through line 346 into the upper cylinder of the slave unit 117′, but is not sufficient to rotate the output shaft 349 and attached cam 351 to close the switch 93 in the motor circuit. Therefore, the lever 121 must be rotated a full 90° into blocking position over the nozzle boot opening to displace a sufficient volume of fluid to rotate the cam 351 into the position where it closes the contacts of switch 83.

The additional rotary motion of the lever 121 required, after completion of the reset, to close the contacts of switch 93, also operates the register mechanisms to complete additional functions. After completion of a delivery, rotation of the lever 121 in a counterclockwise direction to its full vertical position actuates the master and slave units to recock the reset mechanism. This rotation also opens the switch 93 and performs other functions which are inherent in the register control mechanism, such as clutching the counter drives to the shaft 133 or to the reset mechanism or latching the shaft 147 against subsequent clockise rotation, to reclose the switch, after the switch has once been opened, until the shafts have been restored to their initial positions and until the registers have again been reset.

It is obvious that while two slave units have been shown and described, only one slave unit need be provided. For example, unit 153′ could be eliminated and lines 227—229 and 221—225 connected. On the other hand, adidtional slave units can be added to the chain by connecting the cylinders 161 and 159 of the second unit 153″ respectively to the cylinders 157 and 163 of the next unit and so on. The pipes 231 and 225 would then be connected respectively to the cylinders 159 and 161 of the last unit in the chain.

Such additional slave units may be utilized to drive additional computing registers such as 129 and 131; they may be utilized to drive cumulative registers located in the office or elsewhere on the premises; they may be used to drive a printing register, a predetermined stop device or a combination of the two; they may be used to drive inventory control devices or they may be used for other purposes pertaining to the operation of the system which must be driven in synchronism with the meter. The "register" or "registering means" as used in the specification is intended to include any or all of the auxiliary mechanisms discussed in this paragraph.

Naturally any such devices which require resetting for each transaction would need to be provided with resetting units similar to 117″ which are connected to the master unit 117 in a manner similar to that shown in FIGURE 2.

Examples of a printer and predeterminer driven by a meter are found in the patents to Griffith, No. 2,228,820, issued January 14, 1941, and Carroll, 2,250,326, both of which include cumulative counters. An inventory control device is disclosed in the Damon Patent Number 2,247,480, issued July 1, 1941.

Operation

In the following description of the operation of the dispensing system disclosed herein, attention is particularly directed to FIGURES 1 and 2 of the drawings.

Each dispensing cycle is initiated by an attendant, who first removes the nozzle 39 from the boot 111 and then rotates the lever 121 in a clockwise direction to an intermediate position which is determined by the register mechanisms.

Rotation of the lever 121 in the clockwise direction is transmitted through the shaft 83 to move the pistons of the master unit 117 downwardly to displace fluid from the lower cylinder thereof through the conduit 348 into the upper chamber of the slave unit 117'''. The output shaft of the slave unit 117''' is coupled to the reset shaft 147 of the register 131. The fluid entering the upper chamber of the slave unit 117''' rotates the reset shaft 147 clockwise to cause the resetting mechanism to reset the register 131 to zero.

Substantially simultaneously, the fluid displaced from the lower cylinder of the slave unit 117''' flows through the conduit 347 into the upper cylinder of the slave unit 117'' to cause its resetting mechanism to reset the register 129 and the fluid displaced from the lower cylinder of the slave unit 117'' flows through the conduit 346 into the upper chamber of the slave unit 117'. The fluid displaced from the lower chamber of the slave unit 117' flows through the conduit 345 into the upper cylinder of the master unit 117. The output shaft 349 of the slave unit 117' rotates the cam 351 in a clockwise direction but the switch 93 does not close. After resetting of both registers is completed, further rotation of lever 121, in the same direction, is possible and the operator will rotate it to a position in which it fully blocks the boot 111. Such rotation causes further displacement of the pistons of the master and slave units and it is during such further operation that unit 117' acts to close the contacts of the switch 93 to complete the electrical circuit to the motor. This occurs only after completion of the resetting of both registers.

The motor and pump combination 7, 8 then pressurizes the liquid in the discharge pipe up to the flow control valve 29 at the inlet side of the hose reel 33.

As previously disclosed, the shaft 83 continues through the master unit 117 and carries a cam 81 which is rotated counterclockwise as viewed from the rear in FIGURES 1 and 8, to depress the lever 75, the plunger 73 and the valve 71 to open the port 69 of the pilot valve 43. The valve is opened at about the time that switch 93 closes. This relieves the pressure in the upper chamber 59 of the flow control valve 29 when the nozzle valve 41 is open and the pressure at the inlet 27 overcomes the spring 63 to raise the valve 51 from its seat 49 permitting flow of the liquid into the hose and through the valve 41 and the nozzle 39. The operator then controls the flow into the receiving tank by manipulating the nozzle valve 41. The valve 51 remains closed until the nozzle valve opens however because the opening of valve 71 cannot by itself relieve the pressure in chamber 159.

The flow of the liquid being dispensed is measured by the meter 21 causing the output shaft 149, shaft 151 and crank 165 of the master unit 153 to rotate. The pistons of all units all occupy the same relative positions initially. The pistons 173, 175, 181 and 183 of the master unit 153 cyclically displace fluid from each of the cylinders 157 through 163 as the crank 165 rotates and the displaced fluid causes the slave displacement units 153' and 153'' which are hydraulically connected with each other and with the master unit in a series, to rotate in exact synchronism with the master so that the shafts of the master and the slave units occupy corresponding rotative positions at all times. In other words, each of the slave units 153'' and 153' starts with its pistons in the same relative positions as those of the master unit and is rotated in the same direction as the master unit 153 the same amount and at the same speed. This rotation is respectively transmitted through the input shafts 133, to drive the respective gallons counters 135 and to drive the variator mechanism of each register which in turn drives the corresponding cost counters 139 of the registers 131 and 129 so that, at the end of the dispensing operation, the exact volume of the liquid delivered and the cost thereof is indicated on the respective counters of both registers.

A delivery is terminated by the attendant releasing the nozzle valve 41, rewinding the hose 37 on the reel 33, rotating the lever 121 in a counterclockiwse direction to unblock the opening into the boot 111 and thereafter replacing the nozzle 39 in the boot. Closure of the nozzle equalizes the pressures in chambers 27 and 31 of the control valve and liquid bleeds from the channel 55 through the port 61 to balance the pressure in the chamber 59 and the channel 55, above and below the valve 51 so that the spring 63 will push the valve onto its seat 49.

Rotation of the lever 121 in the counterclockwise direction recloses the pilot valve 43. The counterclockwise rotation of the lever 121 also reverses the displacement of fluid from master control unit 117 from the order previously disclosed, so that the fluid flows from the upper cylinder of the master unit 117 into the lower cylinder of the slave unit 117' to reopen the contacts of switch 93 to halt the pump. The fluid displaced from the upper cylinder of the slave unit 117' passes into the lower cylinder of the slave unit 117'', the fluid displaced from the upper cylinder of the slave unit 117'' flows into the lower cylinder of the slave unit 117''' and the fluid displaced from the upper cylinder of the slave unit 117''' flows into the lower cylinder of the master unit 117. The upward movement of the pistons within the slave units 117'' and 117''' respectively rotate the shafts 147 of the registers 129 and 131 to recock the reset mechanisms and to otherwise condition the registers for a subsequent resetting operation.

Modifications

FIGURE 10 shows a hydraulic motion transmitting system or hydraulic coupling comprised of a master fluid displacement unit 353 and a slave fluid displacement unit 353', each having three radial cylinders spaced circumferentially at 120 degrees and preferably in the same plane. Corresponding cylinders of the master unit and the slave unit are designated by the numerals 355, 357 and 359. Each cylinder of the master unit 353 is connected at its outer end by a conduit 361, 363 or 365 to the corresponding cylinder of the slave unit. Pistons 367 sealing the cylinders of each displacement unit are joined by individual connecting rods 369 to the pin 371 of crank 373. As shown, the cranks 373 of the master unit 353 and the slave unit 353' are operated 180 degrees out of phase.

FIGURE 10 also shows a modified structure for compensating the system for liquid losses or excess pressures. In this figure, numeral 372 represents an atmospheric reservoir which is filled with liquid and is elevated above the level of the most elevated of the two units 353 or 353'. Small ports 374 are provided in the uppermost portions of the three cylinders of this unit and are arranged to be uncovered by the corresponding pistons when each reaches its bottom dead center. Pipes 376 connect the reservoir with the ports. Thus once each cycle, opportunity is provided for liquid to enter or for liquid or gas to leave the cylinders, to insure that the system is kept filled with liquid.

It is of course obvious that this compensating system can be used with the four cylinder mechanism of the preferred form in lieu of the pressurized accumulator system shown in FIGURE 2.

The three-cylinder master unit shown in FIGURE 10 is connected to be driven by the meter 21 and one of the registers 129 or 131 is connected to be driven by the slave unit 353'. If it is desired to drive both registers, the system shown in FIGURE 10 can be supplemented with a second system. These systems can be arranged in series as shown in FIGURE 11, or in parallel, as shown in FIGURE 12.

It will be seen that in FIGURE 11, a master unit, which may be like unit 153 or like 353 is mounted on the meter 21 and is connected to drive the slave unit, which may be like 153' or 353', which in turn drives both the register 129 and an additional master unit. The latter is connected to drive a second slave unit which drives the second register 131. Obviously this system can be extended by adding master and slave units, to incorporate additional registering means such as a counter, a predeterminer, a ticket printer or other devices which are commonly employed in connection with dispensing systems.

FIGURE 12 shows two master units mounted for operation by the meter. Each master is connected to drive a slave unit which drives an associated registering means. This type of system can, of course, be expanded by connecting additional master units to be driven by the meter and connecting the corresponding slave units to drive the various registering means.

Substitution of either of the system of FIGURES 11 or 12 for the four cylinder system disclosed in FIGURES 1 and 2, will not alter the operation of the system. All of the other structure shown in FIGURES 1 and 2 would remain basically the same. Obviously either compensating system can be used in the three cylinder or the four cylinder systems.

FIGURE 13 illustrates a modified form of the previously described hydraulic register and switch control system. A master unit 417 is operated manually by the lever 121 mounted on the dispensing stand 105 (FIGURE 2) as previously described. A slave unit 417' is disposed to rotate the cam 351 which controls the motor switch and slave units 417" and 417'" are connected to operate the respective resetting mechanisms of the computing registers 129 and 131. As shown in FIGURE 13, the slave units 417" and 417'" displace one-half the volume of fluid displaced by the master unit 417 and the slave unit 417'. In addition, the slave units 417" and 417'" are hydraulically connected into the system in parallel.

Therefore, when the lever 121 is rotated in the clockwise direction, fluid is displaced from the lower cylinder of the master unit 417, one-half of which enters the upper cylinder of each slave unit 417'" and 417", thereby displacing an equal volume of fluid from the lower cylinder of each of the slave units 417'" and 417". The combined volume displaced is equal to the volume originally displaced from the lower cylinder of the master unit 417. The combined volume of fluid displaced from the lower cylinder of the slave units 417'" and 417" enters the upper cylinder of the slave unit 417' and displaces an equal volume of fluid from its lower cylinder into the upper cylinder of the master.

As previously disclosed in the preferred form, the registers 129 and 131 are reset during the initial displacement of fluid from the lower cylinders of the slave units 417'" and 417", but the combined volume of fluid displaced into the upper cylinder of the slave unit 417' is not sufficient to rotate the cam 351 far enough to close the motor control switch 93. Therefore, upon completion of the clockwise rotation of the lever 121 more fluid is displaced from the lower cylinder of the master unit 417 to rotate the register reset mechanisms beyond the amount required for resetting, for performing other register functions and for closing the motor control switch 93 in the manner previously disclosed.

In the event the slave units 417'" and 417" do not operate in unison, one register will be reset in advance of the other register. However the motor control switch 93 still will not be closed prior to reset of both registers because the volume of fluid required to displace the slave unit 417' by an amount required to close the motor control switch 93 is in excess of the combined volume of fluid required to fill one of the cylinders 417" or 417'" and to move the other to the position required to start resetting of the corresponding register.

After completion of a dispensing operation, the lever 121 is rotated counterclockwise to its vertical position thereby reversing the flow of fluid. Specifically, fluid is displaced from the upper cylinder of the master unit 417 into the lower cylinder of slave unit 417', to open the motor control switch; from the upper cylinder of the slave unit 417' into the lower cylinders of the slave units 417" and 417'" to respectively recock the reset mechanisms of registers 129 and 131; and from the upper cylinders of the slave units 417" and 417'" into the lower cylinder of the master unit 417.

It is obvious that various changes may be made in the form, structure and arrangement of parts of the specific embodiments of the invention disclosed herein for purposes of illustration, without departing from the spirit of the invention. Accordingly, applicants do not desire to be limited to such specific embodiments but desire protection falling fairly within the scope of the appended claims.

We claim:

1. In a liquid dispensing system for an automobile filling station, the combination of a dispensing stand, a discharge conduit, means for supplying liquid under pressure to said conduit, a meter in said conduit for measuring the amount of liquid flowing theerthrough, a valved outlet for said conduit for dispensing measured liquid therefrom, said outlet being disposed at said dispensing stand, computing registering means disposed at a point remote from said meter, hydraulic coupling means, including first liquid displacement means connected to be driven by said meter, additional liquid displacement means connected to drive said registering means, and liquid conduits connecting said respective displacement means, said displacement means being constructed so as to operate in synchronism for driving said registering means in accordance with the amount of liquid flowing through said meter.

2. In a liquid dispensing system for an automobile filling station, the combination of a dispensing stand, a source of liquid, a discharge conduit, a pump having its inlet communicating with said source and its discharge connected with said conduit, a motor for driving said pump, means including a switch disposed at said dispensing stand for starting and stopping said motor, a meter in said conduit for measuring the amount of liquid flowing through said conduit, a valved outlet for said conduit for dispensing measured liquid therefrom, said outlet being disposed at said dispensing stand, computing registering means located remotely with respect to said meter, hydraulic coupling means for driving said registering means in accordance with the amount of liquid flowing through said meter, including liquid displacement units disposed at said meter and at said registering means and liquid conduits connecting said liquid displacement means, said displacement means being connected so as to operate in synchronism.

3. The structure defined by claim 1 wherein each liquid displacement means comprises a number of chambers, a displacement device movable relative to each chamber to expand or contract said chamber and means connecting said devices for controlling the rate and sequence of expansion and contraction of the chambers relative to each other, and wherein said coupling means includes individual conduits connecting each of the chambers of one liquid displacement means with a chamber of another liquid displacement means which is expanding or contracting at the same rate but in opposite phase from that of the connected chamber.

4. In a liquid dispensing system, the combination of a dispensing stand, a discharge conduit, means for supplying liquid under pressure to said conduit, a meter in said conduit, at a point remote from said stand, for measuring the amount of liquid flowing therethrough, a valved outlet for said conduit for dispensing measured liquid therefrom, said outlet being disposed at said dispensing stand, resettable registering means disposed at a point remote from said dispensing stand and meter, power operated resetting means for said registering means, hydraulic coupling means, including synchronized liquid displacement means, connecting said meter to advance said registering means in accordance with the amount of liquid passing through said meter, and means disposed at said dispensing stand and connected with said resetting means for initiating the operation of said resetting means.

5. The structure defined by claim 4 wherein said means for initiating the operation of said resetting means comprises additional hydraulic coupling means, including a number of liquid displacement means and means for causing them to operate in synchronism, means connecting certain of said displacement means to actuate said resetting means and manually operable means disposed at the dispensing stand for actuating one of said liquid displacement means.

6. The structure defined by claim 5 wherein each of said additional liquid displacement means comprises at least two chambers having a displacement device disposed for movement in two directions to alternately expand one chamber while contracting the other and conduits connecting a contracting chamber of one displacement means with an expanding chamber of another displacement means.

7. The structure defined by claim 6 wherein said conduits are arranged to connect said chambers of the various liquid displacement means in a closed series.

8. The structure defined by claim 5 which includes movable control means for starting and stopping the supply of liquid to said conduit and means operable in timed relation with said displacement means for moving said control means to start said supply upon completion of resetting of said registers.

9. The structure defined by claim 6 which includes a first additional conduit for connecting the expanding chambers of certain of said displacement means together, a second additional conduit for connecting the contracting chambers of said certain displacement means together, said additional conduits being connected with an expanding and contracting chamber respectively, of additional displacement means.

10. In a liquid dispensing system, the combination of a discharge conduit, means for supplying liquid under pressure to said conduit, a meter in said conduit for measuring the amount of liquid flowing therethrough, a valved outlet for said conduit for dispensing measured liquid therefrom, a number of registering means and hydraulic coupling means for driving said registering means in synchronism with said meter, said coupling means comprising a liquid displacement unit connected to be actuated by the meter and an additional unit for each registering means, connected to actuate said registering means, each unit comprising two perpendicularly arranged pairs of opposed, expansible chambers, means for successively expanding and contracting said chambers in regular cyclical sequence so that at one point in each cycle one chamber of one pair will be fully expanded, the opposed chamber will be fully contracted and the other two chambers of the other pair will be expanding and contracting respectively, means for connecting fully contracted and the partially contracted chambers respectively of each unit with the fully expanded and partially expanded chambers respectively of the next adjacent unit, whereby to provide a double acting, hydro mechanical, series linkage between all of the like pairs of chambers of all of said units, said chambers and connecting means being filled with liquid so that said units will be operated in synchronism.

11. The structure defined by claim 10 which includes means for maintaining said chambers and chamber connecting means full of liquid.

12. In a liquid dispensing system, the combination of a discharge conduit, means for supplying liquid under pressure to said conduit, a meter in said conduit for measuring the amount of liquid flowing therethrough, a flexible hose, terminating in a valved nozzle, connected to said conduit for dispensing measured liquid therefrom, a dispensing stand disposed at a point remote from said meter and having means thereon for supporting said nozzle, a dispensing control element mounted on said stand for manual operation between initial and dispensing positions through a resetting position, resettable registering means, including resetting means therefor, mounted at a point remote from both said meter and stand, hydraulic coupling means connecting said meter to drive said registering means in synchronism therewith and means connecting said control element to initiate the operation of said register resetting means for resetting the register when said control element is moved from its initial to its resetting position.

13. The structure defined by claim 12 which includes supply control means having stop and start positions for rendering said liquid supplying means effective and ineffective to supply said nozzle, means connecting said dispensing control element with said supply control means, to maintain the latter in its stop position when said element occupies its initial and its resetting positions and to move said supply control means to its start position when said element is moved to its dispensing position.

14. The structure defined by claim 13 which includes hydraulic means connecting said element for actuating said supply control means.

15. The structure defined by claim 12 which includes hydraulic coupling means for connecting said dispensing control element with said resetting means for initiating the operation thereof.

16. The structure defined by claim 12 which includes hose storing means disposed adjacent said dispensing stand for yielding and retracting said hose.

17. The structure defined by claim 16 wherein said dispensing stand is of small size and of a height to support said nozzle support and dispensing control element in positions for convenient manipulation and wherein means distinct from said stand are provided for housing said hose storing device.

18. The structure defined by claim 17 which includes a pit disposed subjacent said dispensing stand, and said hose storing device is disposed in said pit.

19. The structure defined by claim 13 which includes hydraulic coupling means for connecting said dispensing control element with said resetting means for initiating the operation thereof and wherein said coupling means includes means for actuating said supply control means.

20. The structure defined by claim 13 wherein said supply control means includes a valve in said conduit and means operated by said control element for closing and opening said valve.

21. The structure defined by claim 13 wherein said means for supplying liquid to said conduit includes an electric motor pump and wherein said supply control means comprises a switch for said motor pump which is open in said stop position and closed in said start position.

22. The structure defined by claim 21 wherein said supply control means also includes a valve in said conduit, said means connecting said dispensing control element with said supply control means including means for substantially simultaneously closing said switch and opening said valve upon movement of said element from its resetting position to its start position and for opening said switch and closing said valve upon movement of said element from its start position to its initial position.

23. In a liquid dispensing system, the combination of a discharge conduit, means for supplying liquid under pressure to said conduit, a meter in said conduit for measuring the amount of liquid flowing therethrough, a valved outlet for said conduit for dispensing measured liquid therefrom, registering means, said meter and registering means including rotary output and input means respectively, hydraulic coupling for driving said registering means in accordance with the amount of liquid flowing through said meter, said coupling means including a number of rotary liquid displacement units, each of which comprises a number of chambers, a piston movable relative to each chamber to expand and contract said chamber, a rotary mechanism interacting with said pistons for controlling rate and sequence of the expansion and contraction of said chambers relative to each other in a cycle, individual conduits connecting each of the chambers of one unit with a chamber of another unit which is expanding and contracting the same rate but in opposite phase, said chambers and connecting conduits being filled with liquid, means for connecting the rotary mechanism of each unit to one of said rotary means for driving said registering means in synchronism with said meter, a reservoir for liquid, means connecting said reservoir in communication with each of said conduits comprising a port in at least one of each pair of connected chambers, said port being disposed to be uncovered by the associated piston when it moves to the position in which it fully expands said chamber, said piston serving to regulate the flow between the chamber and the reservoir.

24. In a liquid dispensing system, the combination of a dispensing stand, a discharge conduit terminating in a valved outlet at said dispensing stand, means for supplying liquid to said conduit under pressure, a meter disposed in said conduit at a point remote from said stand, resettable registering means disposed at a point remote from both said meter and said stand, register resetting means disposed adjacent said registering means, control means for initiating the operation of the resetting means, including a manually operable device disposed at said stand and hydraulic coupling means for connecting said meter to drive said registering means in accordance with the amount of liquid flowing through said meter.

25. The structure defined by claim 24 wherein said hydraulic coupling means comprises first liquid displacement means connected to be driven by said meter and second liquid displacement means connected to be driven in synchronism with said first displacement means and connected to drive said registering means.

26. In a liquid dispensing system, the combination of a dispensing stand, a discharge conduit terminating in a valved outlet at said dispensing stand, a motor and pump, disposed at a point remote from said stand, for supplying liquid to said conduit under pressure, a meter disposed in said conduit at a point remote from said stand, resettable registering means disposed at a point remote from both said meter and said stand, register resetting means disposed adjacent said registering means, control means for initiating the operation of the resetting means including a manually operable device disposed at said stand, a switch for controlling said motor, means for the preventing of closing of said switch until said registering means are reset, and hydraulic coupling means for connecting said meter to drive said registering means in accordance with the amount of liquid flowing through said meter.

27. The structure defined by claim 26 wherein said hydraulic coupling means comprises first liquid displacement means connected to be driven by the meter and second liquid displacement means connected to be driven in synchronism with said first displacement means and connected to drive said registering means.

References Cited in the file of this patent

UNITED STATES PATENTS

| | | |
|---|---|---|
| 1,493,936 | Hale | May 13, 1924 |
| 1,931,952 | Charles | Oct. 24, 1933 |
| 2,113,676 | Carroll | Apr. 12, 1938 |
| 2,297,610 | De Giers | Sept. 29, 1942 |
| 2,319,444 | Crosby | May 18, 1943 |
| 2,575,562 | Pressler | Nov. 30, 1951 |
| 2,597,050 | Audemar | May 20, 1952 |
| 2,712,884 | Foss | July 12, 1955 |
| 3,027,048 | Rapisarda | Mar. 27, 1962 |